(12) United States Patent
Berscheit et al.

(10) Patent No.: US 9,679,593 B2
(45) Date of Patent: Jun. 13, 2017

(54) CIRCUIT CONNECTION PAD DESIGN FOR IMPROVED ELECTRICAL ROBUSTNESS USING CONDUCTIVE EPOXY

(71) Applicant: Seagate Technology LLC, Cupertino, CA (US)

(72) Inventors: Gary Berscheit, Watertown, MN (US); Jackson Brandts, Watertown, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 14/860,921

(22) Filed: Sep. 22, 2015

(65) Prior Publication Data

US 2016/0086625 A1 Mar. 24, 2016

Related U.S. Application Data

(60) Provisional application No. 62/053,356, filed on Sep. 22, 2014.

(51) Int. Cl.
*G11B 5/48* (2006.01)
(52) U.S. Cl.
CPC ............ *G11B 5/4846* (2013.01); *G11B 5/483* (2015.09); *G11B 5/486* (2013.01); *G11B 5/4833* (2013.01)
(58) Field of Classification Search
CPC ........ G11B 5/483; G11B 5/4833; G11B 5/486
USPC ........................................... 360/294.3, 245.9
See application file for complete search history.

(56) References Cited

U.S. PATENT DOCUMENTS

| 6,297,936 | B1 | 10/2001 | Kant et al. | |
|---|---|---|---|---|
| 7,440,236 | B1 | 10/2008 | Bennin et al. | |
| 8,149,545 | B1 | 4/2012 | Chai et al. | |
| 8,189,301 | B2 | 5/2012 | Schreiber | |
| 8,248,735 | B2* | 8/2012 | Fujimoto | G11B 5/4833 360/294.4 |
| 8,339,748 | B2* | 12/2012 | Shum | G11B 5/483 360/245.8 |
| 8,570,688 | B1 | 10/2013 | Hahn et al. | |
| 8,699,186 | B1 | 4/2014 | Hahn et al. | |
| 8,810,972 | B1* | 8/2014 | Dunn | G11B 5/4873 360/294.4 |
| 8,885,299 | B1* | 11/2014 | Bennin | G11B 5/4873 360/294.3 |
| 9,105,288 | B1* | 8/2015 | Hahn | G11B 5/4853 |

(Continued)

*Primary Examiner* — Jefferson Evans
(74) *Attorney, Agent, or Firm* — Kagan Binder, PLLC (57) ABSTRACT

Disk drives including head suspensions within dual stage actuation systems have improved electrical connectivity between electrical connection pads from flexible circuits as are applied to head suspension assemblies with piezoelectric microactuators as also provided to head suspension assemblies. A more robust electrical connection provides for better control of microactuator actuation for fine movements and positioning of magnetic read/write heads relative to disk data tracks as part of dual stage actuated suspension systems. Electrical connections utilize conductive epoxy for physically and electrically connecting electrically conductive trace connection pads with one or more surfaces of piezoelectric microactuators. Electrical connections include better conductivity by utilizing plural surface portions of electrical connection pads. The result is a more robust and predictable performance for high data resolution within disk drives.

8 Claims, 8 Drawing Sheets

(56) References Cited

U.S. PATENT DOCUMENTS

| | | | |
|---|---|---|---|
| 9,230,580 B1* | 1/2016 | Shum | G11B 5/4873 |
| 9,251,817 B1* | 2/2016 | Hahn | G11B 5/4846 |
| 9,311,938 B1* | 4/2016 | Ee | G11B 5/4853 |
| 2009/0021957 A1* | 1/2009 | Wu | F21S 6/003 |
| | | | 362/555 |
| 2010/0271735 A1* | 10/2010 | Schreiber | G11B 5/5552 |
| | | | 360/290 |
| 2011/0228425 A1* | 9/2011 | Liu | G11B 5/4853 |
| | | | 360/244.2 |
| 2011/0261539 A1* | 10/2011 | Rolston | H05K 3/361 |
| | | | 361/749 |
| 2011/0279929 A1* | 11/2011 | Kin | G11B 5/4853 |
| | | | 360/294.4 |
| 2013/0248233 A1* | 9/2013 | Kanezaki | H05K 1/18 |
| | | | 174/260 |

\* cited by examiner

CIRCUIT CONNECTION PAD DESIGN FOR IMPROVED ELECTRICAL ROBUSTNESS USING CONDUCTIVE EPOXY

PRIORITY CLAIM

The present non-provisional Application claims the benefit of commonly owned provisional Application having Ser. No. 62/053,356, filed on Sep. 22, 2014, which provisional Application is incorporated herein by reference in its entirety.

FIELD OF THE INVENTION

The present invention relates to aspects of head suspension assemblies as are utilized for movably supporting a head within a disk drive, and in particular to head suspension assemblies that include a piezoelectric microactuator for fine head adjustability. The present invention is more particularly directed to electrical connections between such microactuators and conductor elements of such head suspension assemblies.

BACKGROUND OF THE INVENTION

Disk drives as data storage devices typically comprise a stack of rotatable disks to which data is written and read by way of magnetic heads that are movably supported with respect to surfaces of the disks by a like number of head suspension assemblies. One such head suspension assembly is typically movably supported relative to each disk surface so that a magnetic head can be selectively positioned relative to a data track of the disk surface, as such magnetic head is provided on an aerodynamically designed slider so as to fly closely above the disk surface while the disk is spinning. Each head suspension assembly is normally connected to an actuator arm for moving the head suspension and head over the disk surface for data writing and reading, and each actuator arm is connected to be driven by a voice coil drive device. Such an assembly allows each magnetic head to be independently controlled for positioning relative to specific data tracks of the disk surfaces.

The density of data tracks on such disk surfaces has been increasing in order to obtain greater data storage within a given disk surface area. Specifically, the data tracks themselves have become narrower and the radial spacing between tracks has decreased in order to increase disk data density.

In order to provide a second level of adjustability to a magnetic head as provided to a slider of a head suspension assembly and to obtain greater data resolution, microactuators have been developed. In general, a voice coil drive provides a first adjustability for course positioning of the magnetic head and a microactuator can then provide a fine adjustability for resolution of data tracks within high density disk drives. Such systems are considered dual-stage actuated suspension systems.

A common microactuator comprises one or more elements of piezoelectric crystal material such as lead zirconate titanate (PZT) as such elements are strategically provided at one or more locations along a head suspension assembly. A head suspension assembly typically comprises a base plate for connection with an actuator arm, a load beam including a base plate portion, a spring portion and a rigid region, and a flexure for supporting a slider with a magnetic read/write head. The interconnection of the flexure and load beam allow for pitch and roll movement of the aerodynamically designed slider relative to a spinning disk surface as the slider flies on an air bearing created by the spinning disk.

Microactuators have been developed to work on base plates, load beams and flexures by causing a distortion of material, typically stainless steel, by providing an electrical field across fixed elements of piezoelectric material. The controlled application of a voltage difference across a piezoelectric microactuator, such a PZT, causes the piezoelectric microactuator to expand or contract, in order to distort the base plate, load beam or flexure and thus controllably provide a fine movement of the slider and head with respect to a specific data track. Microactuators are sometimes provided in pairs for controlled deflections acting together by applying similar or opposite polarity electrical fields to the piezoelectric element pairs depending upon the location and arrangement of the piezoelectric element pairs.

In order to controllably actuate such piezoelectric microactuators, positive and negative electrical connections are provided to each piezoelectric microactuator. Conductors as are typically provided along head suspension assemblies extending to the head for read/write functionality and for providing voltage across the piezoelectric microactuators of a dual stage actuated head suspension. Such conductors can be provided as wires or as traces of flex type circuits that can be formed integral with or attached along the load beam of a head suspension assembly. Utilizing conductive traces, connection pads are typically provided at the end of the conductive traces for connection with positive and negative voltage surfaces of each piezoelectric microactuator.

Conductive traces themselves are usually comprised as a laminate type structure including a stainless steel structural or support layer with an insulator layer between the stainless steel and any number of conductive traces as may be formed of any electrically conductive material, such a copper. The connection pads are made by creating a circular pad of the stainless steel, insulating material and the copper layer, followed by removing (such as by etching) an area of the stainless steel and insulating material from below the copper layer to provide access to the copper layer through the other layers of the connection pad. Such connection pads are also known to be provided as gold plated copper pads.

In order to electrically and physically connect the electrical connection pad to a surface of the piezoelectric microactuator, which surface also may be gold plated, conductive epoxy is known to be utilized. Conductive epoxy can comprise a conventional epoxy resin that is impregnated with silver flakes and/or particles of sufficient silver density within the resin to render the epoxy capable of providing an electrical connection through the epoxy resin. In addition to including sufficient silver particle density for electrical conductance though the epoxy connection, it is also been determined that good electrical connection between the gold plated copper pad surface and the silver particles of the epoxy is needed. Intermittent electrical connections can result from faulty or insufficient electrical connection at this electrical pad to epoxy interface.

Faulty electrical connection between the connection pad of the flexible circuit and the surface of the piezoelectric microactuator can result from separation of the silver particles at the interface of the conductive epoxy and the gold plated copper surface of the connection pad. This situation is referred to as a resin rich formation at the interface of the gold plated surface of the connection pad with the conductive epoxy. The formation of resin rich zones along the interface with the surface of the connection pad reduces conductivity from the connection pad to the conductive epoxy. Resin rich zones are believed to result sometimes during the curing process of the conductive epoxy due to material differences between the copper connection pad and the epoxy. For example, thermal expansion of one material, such as the copper, during curing can affect the interface as well as material shrinkage of a material, such as the epoxy, during its curing. Other factors can include physical conditions, such as vibrations or otherwise, as may affect this interface during the epoxy curing process.

BRIEF SUMMARY OF THE INVENTION

The present invention overcomes the disadvantages and shortcomings of the prior art disk drive technology by improving the electrical connectivity between electrical connection pads from flexible circuits as are applied to head suspension assemblies with piezoelectric microactuators as also provided to head suspension assemblies. A more robust electrical connection provides for better control of microactuator actuation for fine movements and positioning of magnetic read/write heads relative to disk data tracks as part of dual stage actuated suspension systems.

Electrical connections of the present invention utilize conductive epoxy for physically and electrically connecting electrically conductive trace connection pads with one or more surfaces of piezoelectric microactuators. The result is a more robust and predictable performance for high data resolution within disk drives.

In one aspect of the present invention, a head suspension for supporting a head within a disk drive can comprise a load beam including a base portion for connection to an actuator for moving the load beam relative to a disk and a flexure for connection with a head and to permit movement of the head for orientation thereof relative to a surface of the disk; a microactuator operatively provided and coupled to the load beam for providing fine movements to the load beam and head relative to the disk, the microactuator including a surface for connection with an electrical source to effect fine movement of the load beam; and a flexible circuit provided to extend along the load beam and comprising a plurality of electrical traces along an insulator layer, at least one trace including a connection pad positioned to extend over the surface connection of the microactuator for connection with a controllable power source for selective actuation of the microactuator, wherein the connection pad comprises a conductive first surface that is accessible by an opening within the insulator layer, a conductive second surface, and at least an edge portion between the first and second surfaces, and the connection pad is adhered to the surface connection of the microactuator by a conductive epoxy that is adhered to the surface connection of the microactuator and to the first and second conductive surfaces and the edge portion of the connection pad.

Preferably, the flexible circuit includes a stainless steel support layer on the opposite side of the insulator layer than the electrical traces, wherein the stainless steel support layer also includes an opening to provide accessibility to the connection pad. The connection pad can be offset from the at least one trace so as to be at least partially positioned within the opening of the insulator layer.

In one case, the connection pad can include an opening provided through the connection pad that defines the edge portion that is adhered with the conductive epoxy. The connection pad can have plural openings defining plural edge portions with the plural edge portions and a portion of the second surface of the connection pad between the openings being adhered with the conductive epoxy. The plural openings of the connection pad can further be symmetrically arranged.

In another case, the connection pad can comprise an open edge portion that provides the edge portion that is adhered with the conductive epoxy along with portions of the first and second surfaces of the connection pad adjacent to the edge portion. Such a connection pad can include plural open edge portions to provide plural edge portions that are adhered with the conductive epoxy along with portions of the first and second surfaces of the connection pad adjacent to each of the edge portions. Moreover, the plural open edge portions can be created by tabs that extend from the connection pad.

According to another aspect of the present invention, a flexible circuit can be provided onto at least one surface of a head suspension and for providing data signals and a power supply to a microactuator of the head suspension, wherein the flexible circuit comprises a plurality of electrical traces provided to extend along an insulator layer, at least one trace for connection with a controllable power source for selective actuation of a microactuator the at least one trace including a connection pad positioned for extension over a surface connection of the microactuator, wherein the connection pad comprises a conductive first surface that is accessible by an opening within the insulator layer, a conductive second surface, and at least an edge portion between the first and second surfaces so that the connection pad can be adhered to the surface connection of the microactuator by a conductive epoxy with the conductive epoxy to be adhered to the surface connection of the microactuator and to the first and second conductive surfaces and the edge portion of the connection pad.

BRIEF DESCRIPTION OF THE SEVERAL VIEWS OF THE DRAWINGS

Other important objects and advantages of the present invention will be apparent from the following detailed description of the invention taken in connection with the accompanying drawings in which.

DETAILED DESCRIPTION OF THE INVENTION

The foregoing specific embodiments of the present invention as set forth in the specification herein are for illustrative purposes only. Various deviations and modifications may be made within the spirit and scope of the invention without departing from the main theme thereof.

Figure 1:
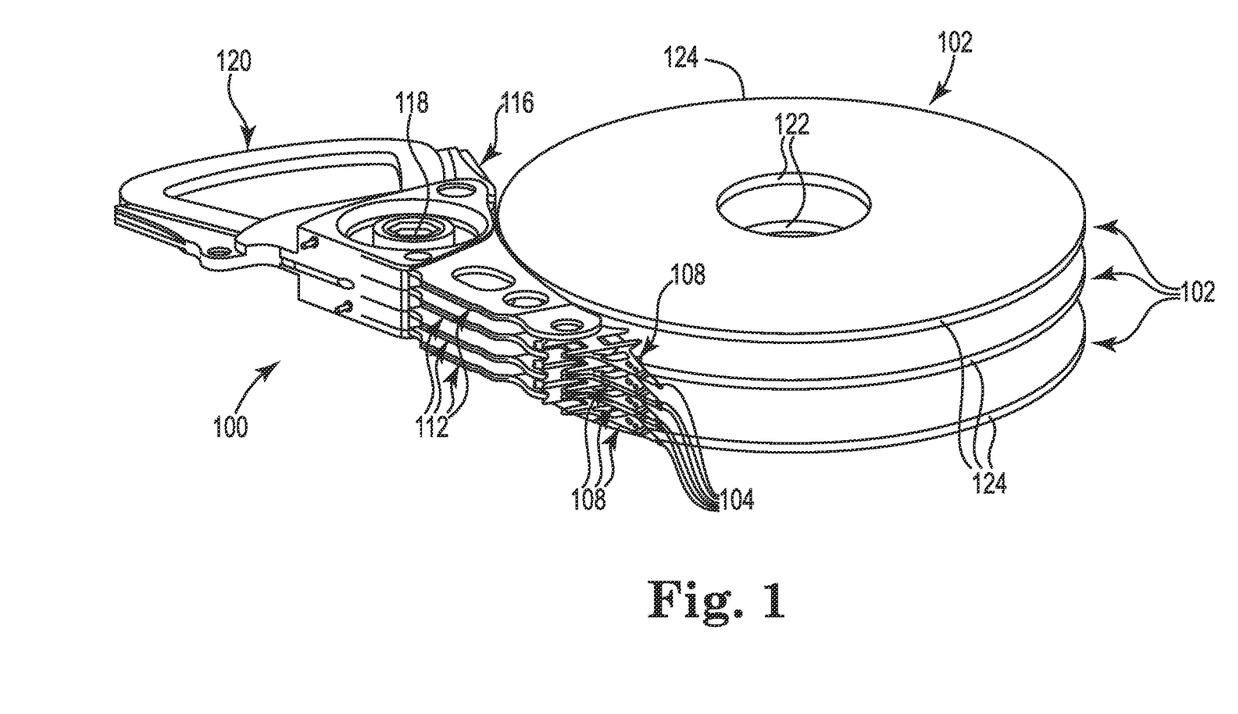
FIG. 1 is a perspective view of a head stack assembly including plural stacked actuator arms with each arm having a head suspension assembly in accordance with the present invention.

FIG. 1 illustrates a perspective view of exemplary components of a data storage device including a head stack assembly 100 and media 102. In one embodiment, magnetic media 102 stores information as domains in a plurality of circular, concentric data tracks on data disks as such disks are conventionally mountable to a spindle motor assembly (not shown) that can rotate media 102 and cause its data surfaces to pass under respective bearing slider surfaces. As illustrated, each surface of media 102 has an associated slider 104, each of which slider 104 carries a magnetic head comprising read and write transducers that communicate with the data tracks of the surfaces of media 102.

Sliders 104 are each supported by a head suspension assembly 108, which are in turn attached to actuator arms 112 of an actuator mechanism 116 to form the head stack assembly 100. Actuator mechanism 116 can be rotated about a shaft 118 by a voice coil drive 120, which can be conventionally controlled by servo control circuitry. Voice coil drive 120 can rotate actuator mechanism 116 in either rotary direction for controllably positioning the head suspension assemblies 108 over the surfaces of the spinning disks and thus the heads of the sliders 104 relative to desired data tracks between inner diameters 122 and outer diameters 124 of media 102. As also well known, the sliders 104 are themselves aerodynamically designed to fly on an air bearing that is created adjacent to each disk surface during disk rotation.

Figures 2, 3:
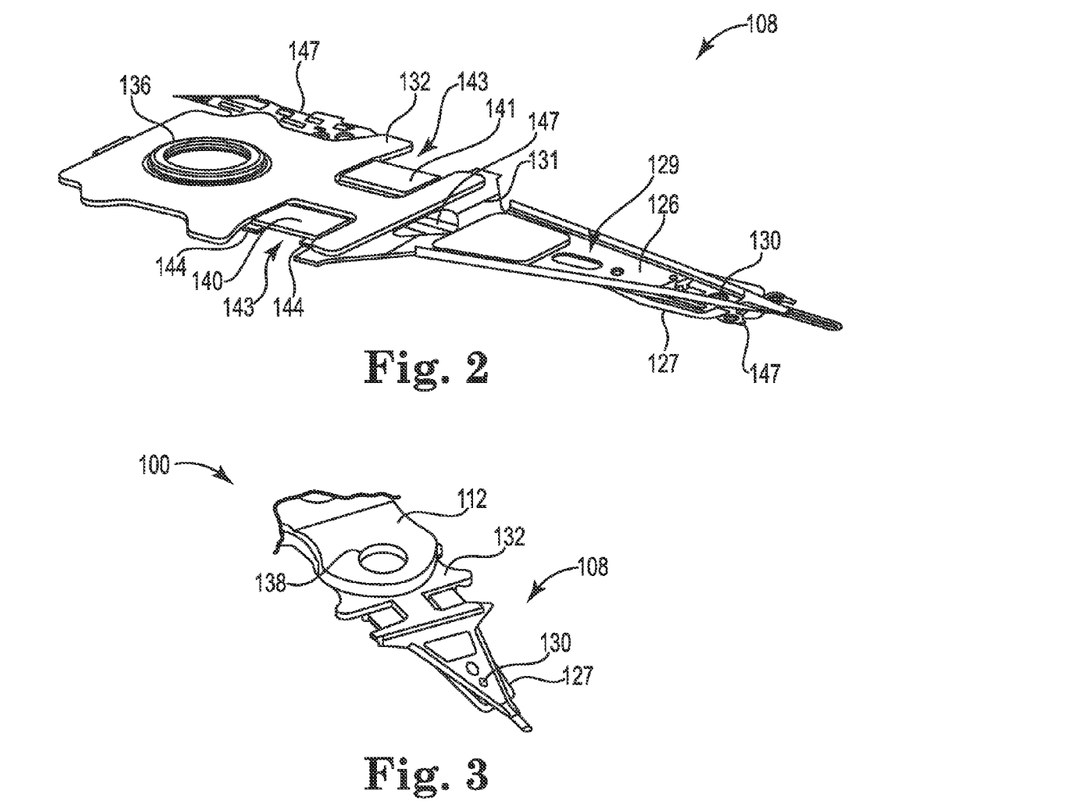
FIG. 2 is a perspective view of a head suspension assembly of the present invention including a pair of microactuators arranged in the baseplate region of the head suspension assembly and including electrical connection components of the present invention.
FIG. 3 is a perspective view of a head suspension assembly of the present invention as attached to an actuator arm at the baseplate.

FIG. 2 illustrates an enlarged perspective view of exemplary head suspension assembly 108 in accordance with aspects of the present invention. FIG. 3 is a partial perspective view of the head stack assembly 100 illustrated in FIG. 1 including head suspension assembly 108 as illustrated in FIG. 2 and as connected with an actuator arm 112 for movement relative to a disk surface. Head suspension assembly 108 includes a load beam 126, a flexure 127, a mount or base plate 132, and a slider 104. The load beam itself comprises a base portion that is connected with the base plate 132, such as by laser welding, a spring or hinge region 131, and a rigid region leading from the spring region to the tip of the head suspension assembly 108. Load beam 126 supports the slider 104 (not seen in FIGS. 2-3) carrying transducers via the separately formed and attached flexure 127. Alternatively, an integrated gimbal can be utilized instead of the flexure 127, as well known. For example, a gimbal is typically integrated into load beam 126, while a flexure is a separate component that can be laser welded to load beam 126 and provides a slider mounting portion that is pivotable about a dimple as provided from an end portion of the rigid region of the load beam 126, such as illustrated. Regardless of type, a gimbal or a flexure 127 provides a movable slider mounting pad to which head or slider 104 is attached so that the slider can move at least in pitch and roll directions in response to variations while flying relative to a disk surface.

The spring or hinge region 131 provides load beam 126 with a preload force that acts against the lift force action of the aerodynamic slider as it flies relative to a disk surface. The preload force urges the slider 104 towards the surface of a medium during flight to maintain a desired fly height. In some embodiments, hinge 131 is a separate component from load beam 126 and can be connected to load beam 126 by laser welding. In other embodiments, hinge 131 is integrated with and contiguous with load beam 126 as a single part. Mount plate or baseplate 132 provides an attachment structure for coupling actuator arm 112 to a head suspension assembly 108. In one embodiment, baseplate 132 is laser welded to a base plate portion of the load beam 126. As illustrated in FIG. 2, the attachment structure can be a boss tower 136 of the base plate 132 that is configured to insert into aperture 138 (FIG. 4) of an actuator arm 112 and undergo a swaging process, such as ball swaging, to couple actuator arm 112 to a head suspension assembly 108. Boss tower 136 is preferably integrally formed with baseplate 132 and is made of the same material. For example, baseplate 132 can be made of a ferrite, such as stainless steel, aluminum, engineered plastic and the like.

Head suspension assembly 108 also includes a pair of microactuators 140 and 141. While voice coil motor 120 rotates actuator mechanism 116 to position sliders 104 relative to desired data tracks between inner diameters 122 and outer diameters 124 of media 102 (see FIG. 1), microactuators 140 and 141 provide head suspension assembly 108 with fine or precision-type positioning of sliders 104 relative to desired data tracks between inner diameters 122 and outer diameters 124. In one embodiment, microactuators 140 and 141 are piezoelectric actuators. Piezoelectric actuators convert an electric signal into controlled physical displacements and, as such, piezoelectric actuators are made of fragile materials. Exemplary materials include ceramics and metal electrode foils. A common microactuator material and design includes one or more elements of piezoelectric crystal material such as lead zirconate titanate (PZT) as such elements are strategically provided at one or more locations along a head suspension assembly. Microactuators have been developed to work on base plates, load beams and flexures by causing a distortion of material, typically stainless steel of the load beam or a flexure, by providing an electrical field across fixed elements of piezoelectric material. The controlled application of a voltage difference across a piezoelectric microactuator, such a PZT, causes the piezoelectric microactuator to expand or contract, in order to distort the base plate, load beam or flexure and thus controllably provide a fine movement of the slider and head with respect to a specific data track. In accordance with the exemplary head suspension assembly of FIGS. 1-4, microactuators 140 and 141 are provided as a pair in order to controllably distort the head suspension assembly 108 within its base plate region. In this case, the microactuators 140 and 141 are provided as a pair for controlled deflections acting together by applying similar or opposite polarity electrical fields to the piezoelectric element pairs depending upon the location and arrangement of the piezoelectric element pairs.

Figure 4:
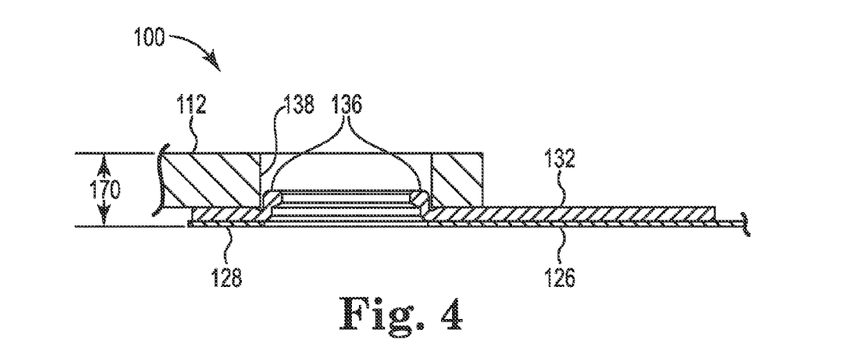
FIG. 4 is a partial cross-sectional view of the connection between a baseplate of a head suspension assembly and an actuator arm.

FIG. 4 is an enlarged section view representative of a portion of the head stack assembly 100. More specifically, FIG. 4 illustrates a section view of a portion of actuator arm 112, baseplate 132 and a base plate portion 128 of load beam 126 before boss tower 136 is swaged to aperture 138. As illustrated in FIG. 4, the z-height 170 of the head stack assembly 100 includes an overall height or thickness of actuator arm 112, baseplate 132 and load beam 126.

As illustrated in FIG. 2, microactuators 140 and 141 are located within inlets 143 that are provided within the profile of the baseplate 132 and have heights that are substantially the same or less than the height of baseplate 132. In this way, the rigid material of baseplate 132 provides protection to the fragile material of microactuators 140 and 141. The microactuators 140 and 141 are each preferably supported in position by edges portions 144 of the base plate portion of the load beam 126 adjacent to the inlets 143 of the baseplate 132. Specifically, edge portions 144 preferably extend within the inlets 143 along at least two sides so as to provide a supporting ledge structure for the microactuators 140 and 141. More preferably, the edges 144 provide a surface to bond or adhere edges of the microactuators 140 and 141 so that as they are extended or retracted, they provide a predictable and controllable movement to the head suspensions assembly. In the illustrated embodiment, extension of one of the microactuators 140 and 141 and contraction of the other of the microactuators 140 and 141 by application of opposite electrical fields to each of the microactuators 140 and 141 causes a deflection or twisting of the base plate portion 128 of the load beam 126, thus controllably moving the rigid region 129 of the load beam 126 and thus the flexure 127 and slider 104. A reverse application of electrical field to each of the microactuators 140 and 141 will cause an opposite but similar deflection or twisting of the head suspension assembly.

Figure 5:
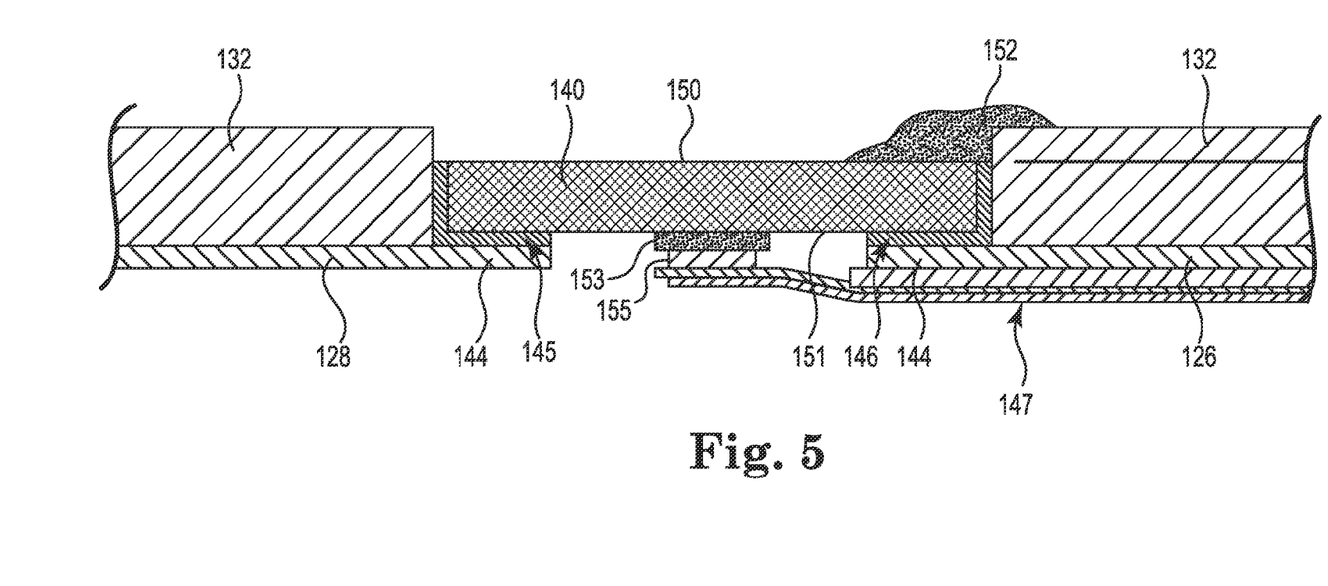
FIG. 5 is partial cross-sectional view of a baseplate mounted microactuator in accordance with an aspect of the present invention including electrical connections to two sides of a piezoelectric microactuator including the provision of conductive adhesive.

In order to bond or adhere the microactuators 140 and 141 to the edge portions 144 at each side of the baseplate 132 within the inlets 143, an epoxy adhesive is preferably used as shown in FIG. 5 at 145 and 146. Any type of adhesive or bonding technique is contemplated provided that the connection is preferably a non-conductive connection between the piezoelectric material and the typically conductive material of the baseplate 132 and load beam 126. That is to say, that it is preferable that the microactuators 140 and 141 be supported and fixed to the base plate 132 and load beam 126 in an electrically non-conductive manner along at least two sides so as to effectively provide deflection to the load beam upon expansion or contraction of each microactuator 140 and 141.

Electrical conductors are provided along the head suspension assembly by way of one or more flexible circuits 147 as may comprise any number of conductors as are needed for electrical connection with the read and write heads of the slider 104 as well as for microactuator control as discussed below. Flexible circuits are well known, per se, and as provided and bonded along head suspension assemblies for electrical connection purposes. As shown in FIG. 2, a flexible circuit 147 runs along the load beam 126 from the baseplate region 128 all the way to near the end of the rigid region 129 to electrically connect with the read/write head of the slider 104. Typically, certain leads or traces of the flexible circuit also run alongside each side of the flexure to extend to the slider 104 for balance.

A flexible circuit can comprise any number of leads or traces that are usually comprised of conductive metal, such as copper, and are commonly supported together on a substrate of semi-rigid material such a stainless steel with a layer of insulator material in between, such as comprising polyimide. Electrical connections with the slider 104 can be conventionally done with wires or direct connections as known.

To controllably provide such expansion and contraction of the piezoelectric material of the microactuators 140 and 141, an electrical field is applied across the thickness of each of the microactuators 140 and 141. To do this, a first electrical connection is preferably provided to one surface of each microactuator 140 and 141 and a second electrical connection is preferably provided to a second surface of each microactuator 140 and 141. Specifically, a positive electrical connection should be provided to one surface and a negative electrical connection provided to the other surface.

As shown in FIG. 5, a first electrical connection is provided by way of a deposit of conductive epoxy 152 provided between a first surface 150 of the microactuator 140 and one or more surface portions of the baseplate 132. The conductive epoxy is shown as deposited along a top surface edge portion of the microactuator 140 connecting with a vertical side edge and a top surface of the baseplate 132.

Figure 6:
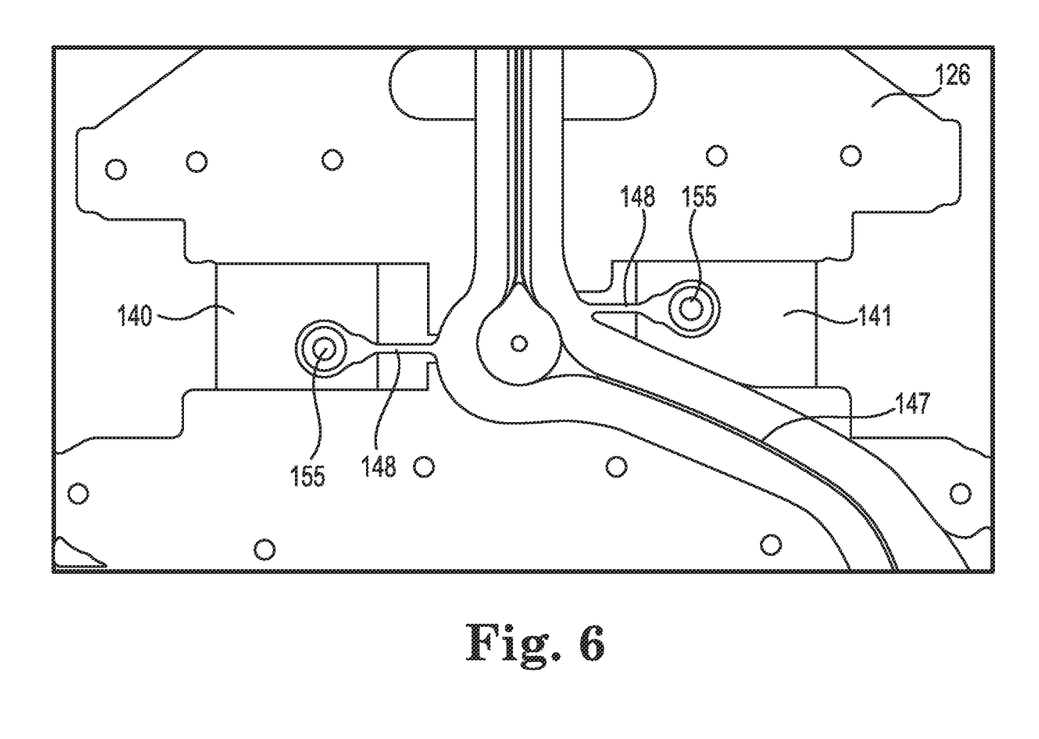
FIG. 6 is a partial bottom side view of the head suspension assembly of FIG. 2 showing a flexible circuit routed over the portion of the head suspension assembly and specifically routed to termination points to extend over and connect with surface points of a surface of the plural microactuators.

A second electrical connection is provided to a second surface 151 of the microactuator 140. As shown in FIG. 6, electrical trace portions 148 extend from the flexible circuit 147 as routed along the bottom surface (based on the orientation of FIG. 2) so as to be positioned to extend over a surface connection portion of the second surface 151 of the microactuator 140. In particular, the trace portions 148 terminate at connection pads 155 that are connected with the surface connection of the second surface 151 of microactuator 140 by way of second deposit of conductive epoxy 153. The connection pads 155 provide a conductor surface for connection with the surface connection of the second microactuator surface 151 by way of the conductive epoxy 153, as further described below. With the traces 148 electrically connected at their other end with a selectable power source (not shown), electrical fields of opposite polarities can be controllable and selectively created across the microactuator 140 for causing microactuator expansion and contraction, as known.

Figure 7:
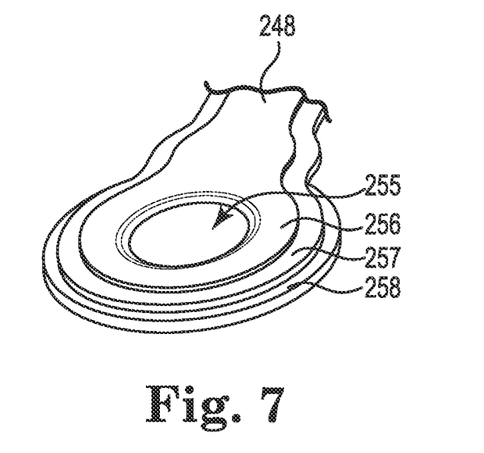
FIG. 7 is a perspective view of an electrical trace portion of a flexible circuit terminating at a conventional electrical connection pad and as adhered to a surface of a piezoelectric microactuator.
Figure 8:
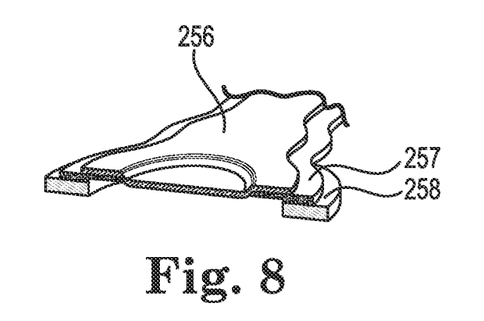
FIG. 8 is a cross-sectional view of the connection pad of FIG. 7 showing the construction of the connection pad as including a conductor, an insulating layer, and a support layer where the conductor can be accessed through the insulating layer and the support layer.
Figure 9:
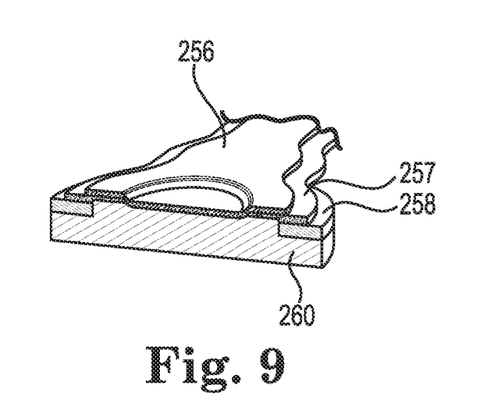
FIG. 9 is a view similar to that of FIG. 8, but with conductive epoxy provided between the connection pad and the surface of the microactuator.

FIGS. 7-9 show a conventional connection pad 255 as a termination point of a trace 248 with the connection pad 255 comprising a copper conductor 256, a polyimide insulating layer 257, and a stainless steel support layer 258. The insulating layer 257 and the support layer 258 are typically etched or otherwise formed in the shape of a ring, with the support layer ring larger than the insulating layer ring. Such a construction allows access to the copper conductor 256 from its bottom side (i.e. from the stainless steel support layer side) for electrical connection with a surface of a microactuator 140. The conductor is shown as also having a dished or recessed central portion for improved access to the conductor surface at a same level as a lower insulating layer surface. As shown in FIG. 9, such a construction allows for conductive epoxy 260 to adhere to the central region of the conductor 256, an annular surface portion of the insulating layer 257, and the annular lower surface of the stainless steel support layer 258. As such, electrical connection is provided from the conductor 256 to a surface connection point of a microactuator surface.

It is an object of the present invention to improve the electrical connectivity between such a conductor and the conductive epoxy. As discussed above in the Background section, various circumstances particular during the curing stage of the conductive epoxy can lead to resin rich regions along the interface of the copper conductor layer and the conductive epoxy. Such resin rich regions can be deficient in the mixture concentration of silver particles or flakes and thus have reduced conductivity in those regions. Insufficient conductivity can thus affect microactuator performance.

Figure 10:
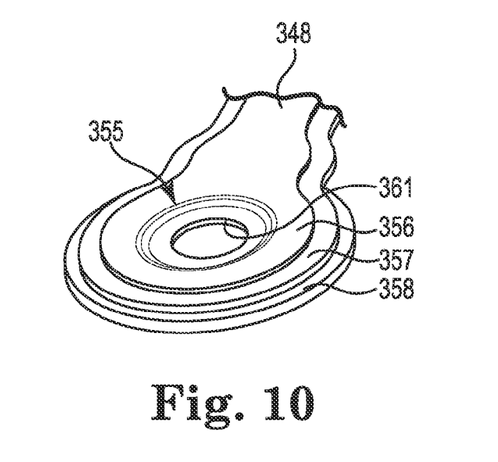
FIG. 10 is a perspective view of an electrical trace portion of a flexible circuit terminating at a first embodiment of an electrical connection pad in accordance with the present invention and as adhered to a surface of a piezoelectric microactuator.
Figure 11:
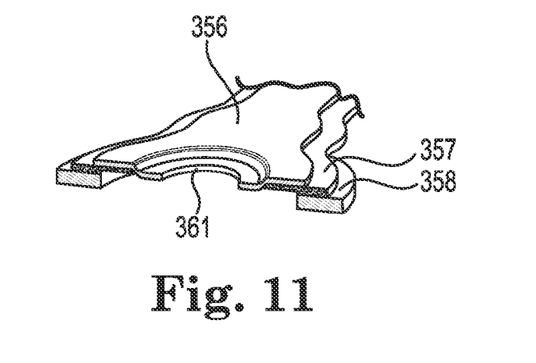
FIG. 11 is a cross-sectional view of the connection pad of FIG. 10 showing the construction of the connection pad as including a conductor, an insulating layer, and a support layer where the conductor can be accessed through the insulating layer and the support layer.
Figure 12:
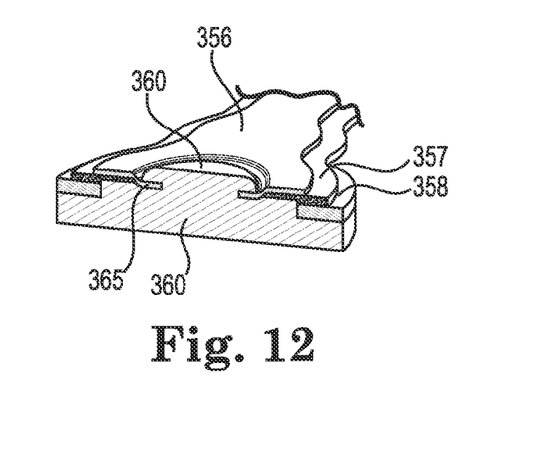
FIG. 12 is a view similar to that of FIG. 11, but with conductive epoxy provided between the connection pad and the surface of the microactuator, wherein the conductive epoxy is further adhered first and second surfaces of the conductor and at least an edge portion between the first and second surfaces of the conductor.

FIGS. 10-12 show a first embodiment of a connection pad 355 in accordance with the present invention that provides for an improved electrical connection at the interface of the trace conductor 356 with the conductive epoxy 360. In accordance with the present invention, it is desirable to improve this electrical connection by at least partially encapsulating a portion of the conductor 356 to increase the area of the interface between the conductor 356 and the conductive epoxy 360 and to increase such interface along at least an edge portion and a second surface portion of the conductor for improved silver particle or flake connectivity with the conductor 356. Moreover, any force or activity caused within the dynamics of the adherence or curing process will advantageously apply to both sides of a conductor portion surrounded by the conductive adhesive. For example, a mechanical action during a curing process of the conductive adhesive tending to pull adhesive away on one side of a conductor portion would tend to urge adhesive on the other side of the conductor portion toward the conductor.

In this embodiment, the conductor 356 also terminates as a circular connection pad 355 that is preferably provided with a dished or recessed central portion. The recessed central portion is not needed, but can be provided to create a volume where adhesive can flow to at least partially surround or encapsulate at least a portion of the conductor 356 of the connection pad 355. In order to provide improved conductive epoxy 360 access to first and second oppositely facing surfaces of the conductor and at least one edge portion between the first and second surfaces, an opening 361 is provided through the conductor, preferably as shown at a central location. The opening 361 can be offset or otherwise within the shape of the connection pad 355. This opening 361 allows a flow of the conductive epoxy prior to curing from a first or bottom surface of the conductor 356 through the opening 361 and at least partially over a second or top surface of the conductor 356. Preferably, the conductive epoxy 360 is controlled to flow and substantially fill the recessed central region of the conductor 356. Then, the conductive epoxy is permitted to cure while in contact with both of the first and second surfaces and the circular edge defining the opening 361 to improve conductivity along the interface. The result, as shown in FIG. 12 is an encapsulated portion 365 that in this embodiment comprises an annular portion of the conductor 356 surrounding the opening 361. It is contemplated that the opening can be of any shape or size and that the connection pad shapes, sizes and orientation to one another can be modified in accordance with the present invention.

Figure 13:
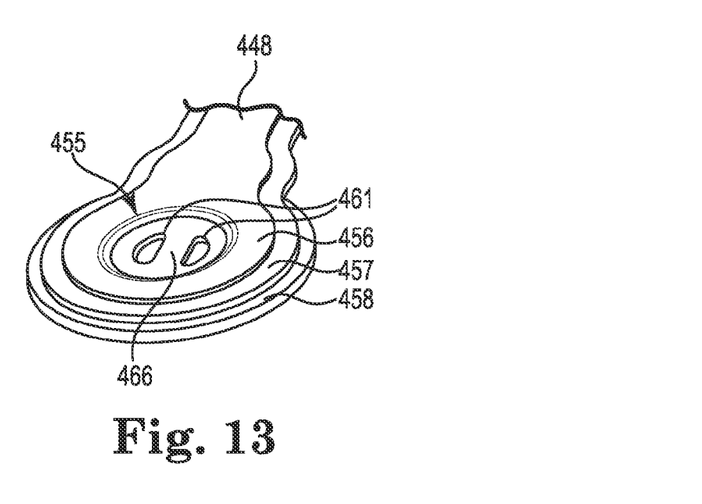
FIG. 13 is a perspective view of an electrical trace portion of a flexible circuit terminating at a second embodiment of an electrical connection pad in accordance with the present invention and as adhered to a surface of a piezoelectric microactuator.
Figure 14:
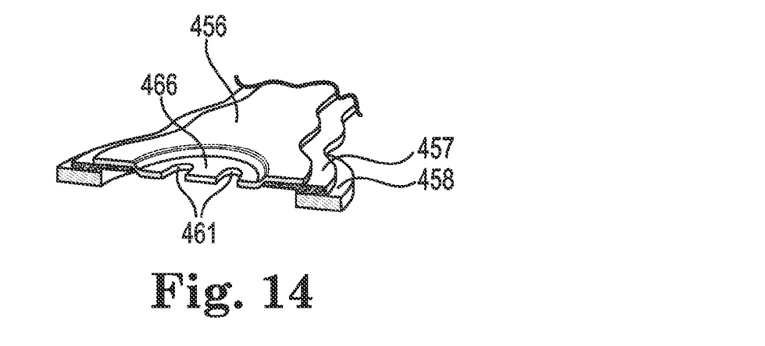
FIG. 14 is a cross-sectional view of the connection pad of FIG. 13 showing the construction of the connection pad as including a conductor, an insulating layer, and a support layer where the conductor can be accessed through the insulating layer and the support layer.
Figure 15:
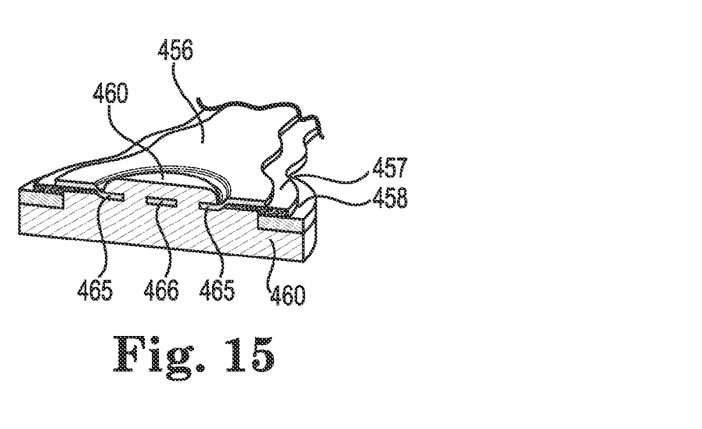
FIG. 15 is a view similar to that of FIG. 14, but with conductive epoxy provided between the connection pad and the surface of the microactuator, wherein the conductive epoxy is further adhered first and second surfaces of the conductor and at least an edge portion between the first and second surfaces of the conductor.

FIGS. 13-15 show another embodiment of a connection pad 455 in accordance with the present invention that provides for an improved electrical connection at the interface of the trace conductor 456 with the conductive epoxy 460. Like the embodiment of FIGS. 10-12, a trace 448 terminates at conductor 456 that is preferably provided with a dished or recessed central portion. The insulating layer 457 terminates as a ring surrounding the dished central portion of the conductor 456 and the support layer 458 terminates as a ring larger than that of the insulating layer 457.

A plurality of openings 461 are shown as provided through the central dished or recessed conductor 456 leaving an encapsulation portion 466 between the plural openings 461. As shown in FIG. 15, these openings 461 allow a flow of the conductive epoxy prior to curing from a first or bottom surface of the conductor 456 through the plural openings 461 and at least partially over a second or top surface of the conductor 456. Preferably, the conductive epoxy 460 is controlled to flow and substantially fill the recessed central region of the conductor 456. Then the epoxy is permitted to cure while in contact with both the first and second surfaces and the edges defining the openings to improve conductivity along the interface. The result of this embodiment, as shown in FIG. 15 is an encapsulated portion 466 between the openings 461 and an encapsulated annular portion 465 similar to portion 365 described above. As above, it is contemplated that any number of openings can be provided and that the openings can be of any shape or size. Also, the connection pad shapes, sizes and orientation to one another can be modified in accordance with the present invention.

Figure 16:
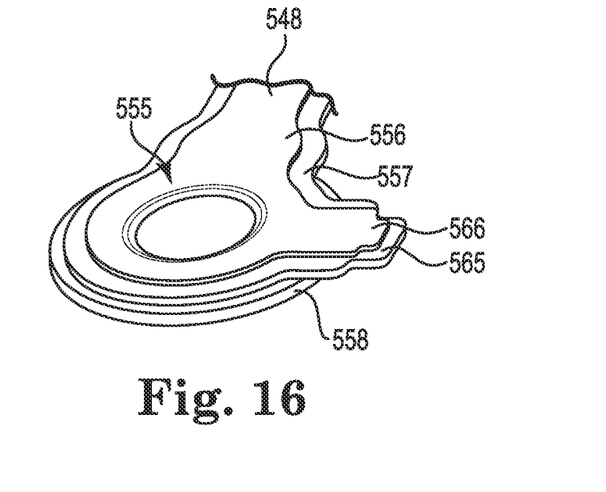
FIG. 16 is a perspective view of an electrical trace portion of a flexible circuit terminating at a third embodiment of an electrical connection pad in accordance with the present invention and as adhered to a surface of a piezoelectric microactuator.
Figure 17:
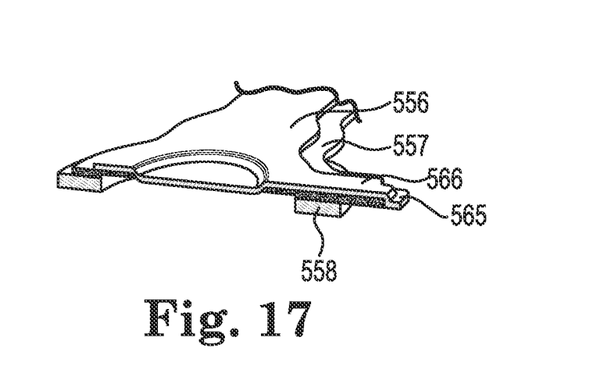
FIG. 17 is a cross-sectional view of the connection pad of FIG. 16 showing the construction of the connection pad as including a conductor, an insulating layer, and a support layer where the conductor can be accessed through the insulating layer and the support layer.
Figure 18:
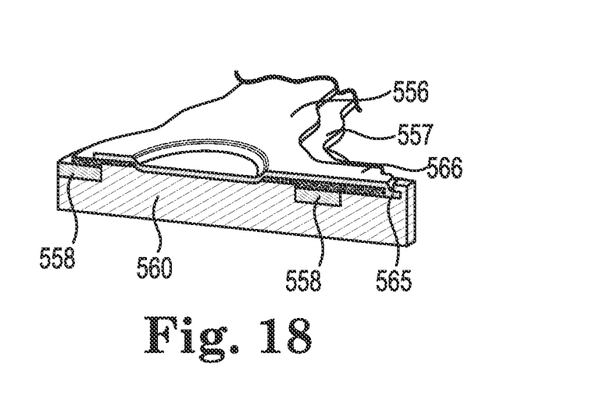
FIG. 18 is a view similar to that of FIG. 17, but with conductive epoxy provided between the connection pad and the surface of the microactuator, wherein the conductive epoxy is further adhered first and second surfaces of the conductor and at least an edge portion between the first and second surfaces of the conductor.

FIGS. 16-18 show yet another embodiment of a connection pad 555 in accordance with the present invention that also provides for an improved electrical connection at the interface of the trace conductor 556 with the conductive epoxy 560. A trace 548 terminates at conductor 556 that is also preferably provided with a dished or recessed central portion. The insulating layer 557 terminates as a ring surrounding the dished central portion of the conductor 556 and the support layer 558 terminates as a ring larger than that of the insulating layer 557.

This embodiment differs from those of FIGS. 10-12 and 13-15 in that an encapsulation portion 565 is provided external or outside to the footprint of the connection pad 555. In the embodiments above, encapsulation portions 365, 465 and 466 have each been internal or inside with respect to the footprint of the connection pads 355 and 455. In this case, the encapsulation portion 565 is extended by an arm portion 566 so as to be positioned beyond the annular ring terminations of the insulating layer 557 and the support layer 558. As also shown, the insulating layer 557 is preferably also extended partially along the arm portion 566 to provide adequate insulation over the support layer material. As shown in FIG. 18, a flow of the conductive epoxy 560 prior to curing can be controlled from a first or bottom surface of the conductor 556 along and around the encapsulation portion 565 and at least partially over a second or top surface of the conductor 556. Then the epoxy 560 is permitted to cure while in contact with both the first and second surfaces and the edges defining the encapsulation portion 565 of the arm 566 to improve conductivity along the interface. The result of this embodiment, as shown in FIG. 18 is an encapsulated portion 565 at the end of the arm portion 566. It is contemplated that any number of such arm portions or extension of any size and shape can be provided. The connection pad shapes, sizes and orientation to one another can be modified in accordance with the present invention.

Moreover, it is contemplated that designs of the present invention can include both internal and external encapsulation designs. For example, a conductor termination can include one or more opening and one or more extension portions for providing the ability to improve conductivity both internal to and external to the footprint and design of the connection pad.

Conductive epoxy itself is well known and commercially available. Typically, silver is utilized in particle or flake form within the epoxy resin material of sufficient mix concentration so that electrical conductivity is achieved through the epoxy resin within desired resistivity limits. It is further contemplated that other adhesives than epoxies can be utilized in accordance with the aspects of the present invention. Any adhesive should have sufficient cohesive properties with the materials of the conductor material and with the microactuator material and should be able to be compatible with and mixable with sufficient conductive material to create a sufficient electrical connection through its volume as applied. Conductive materials of any composition are also contemplated to be provided with such adhesive as having the material properties to do so. Further conductive adhesives wherein the adhesive itself is sufficiently electrically conductive are also contemplate, as such adhesives may not require additional conductive particles, flakes or the like to be mixed within the adhesive composition.

What is claimed is:

1. A head suspension for supporting a head within a disk drive, the head suspension comprising:
   a load beam including a base portion for connection to an actuator for moving the load beam relative to a disk and a flexure for connection with a head and to permit movement of the head for orientation thereof relative to a surface of the disk;
   a microactuator operatively provided and coupled to the load beam for providing fine movements of the load beam relative to the disk, the microactuator including a surface for connection with an electrical source to effect fine movement of the load beam;
   a flexible circuit provided to extend along the load beam and comprising a plurality of electrical traces along an insulator layer, at least one trace including a connection pad positioned to extend over the surface connection of the microactuator for connection with a controllable power source for selective actuation of the microactuator, wherein the connection pad comprises a conductive first surface that is accessible by an opening within the insulator layer, an oppositely facing conductive second surface, and at least an edge portion between the first and second surfaces, and the connection pad is adhered to the surface connection of the microactuator solely and without further structural interconnection by a conductive adhesive that is adhered to the surface connection of the microactuator and to the first and second conductive surfaces and the edge portion of the connection pad so as to encapsulate the edge portion and at least adjacent edges of the first and second conductive surfaces with conductive adhesive for providing electrical conduction between the connection pad and the surface of the microactuator and also to solely physically connect the connection pad to the surface of the microactuator.

2. The head suspension of claim 1, wherein the flexible circuit further comprises a stainless steel support layer on the opposite side of the insulator layer than the electrical traces, wherein the stainless steel support layer also includes an opening to provide accessibility to the connection pad.

3. The head suspension of claim 2, wherein the connection pad is offset from the at least one trace so as to be at least partially positioned within the opening of the insulator layer.

4. The head suspension of claim 3, wherein the connection pad includes an opening provided through the connection pad that defines the edge portion that is adhered with the conductive adhesive.

5. The head suspension of claim 4, wherein the connection pad includes plural openings defining plural edge portions with the plural edge portions and a portion of the second surface of the connection pad between the openings being adhered with the conductive adhesive.

6. The head suspension of claim 5, wherein the plural openings of the connection pad are symmetrically arranged.

7. The head suspension of claim 3, wherein the connection pad comprises an arm portion that extends from the connection pad and provides the edge portion that is adhered with the conductive adhesive along with portions of the first and second surfaces of the connection pad adjacent to the edge portion.

8. A flexible circuit to be provided onto at least one surface of a head suspension and for providing data signals and a power supply to a microactuator of the head suspension, the flexible circuit comprising:
   a plurality of electrical traces provided to extend along an insulator layer, at least one trace for connection with a controllable power source for selective actuation of a microactuator the at least one trace including a connection pad positioned for extension over a surface connection of the microactuator, wherein the connection pad comprises a conductive first surface that is accessible by an opening within the insulator layer, an oppositely facing conductive second surface, and at least an edge portion between the first and second surfaces so that the connection pad can be adhered to the surface connection of the microactuator solely and without further structural interconnection by a conductive adhesive with the conductive adhesive to be adhered to the surface connection of the microactuator and to the first and second conductive surfaces and the edge portion of the connection pad so as to encapsulate the edge portion and at least adjacent edges of the first and second conductive surfaces with conductive adhesive for providing electrical conduction between the connection pad and the surface of the microactuator and also to solely physically connect the connection pad to the surface of the microactuator.

* * * * *